US009453474B2

(12) United States Patent
Kramer et al.

(10) Patent No.: US 9,453,474 B2
(45) Date of Patent: Sep. 27, 2016

(54) METHOD FOR OPERATING A DIRECT FUEL INJECTION SYSTEM

(71) Applicant: Ford Global Technologies, LLC, Dearborn, MI (US)

(72) Inventors: Ulrich Kramer, Bergisch Gladbach (DE); Michael Damian Czekala, Canton, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 13/916,084

(22) Filed: Jun. 12, 2013

(65) Prior Publication Data

US 2014/0366845 A1 Dec. 18, 2014

(51) Int. Cl.

| | |
|---|---|
| ***F02M 37/00*** | (2006.01) |
| ***F02D 41/38*** | (2006.01) |
| ***F02M 59/46*** | (2006.01) |
| ***G01M 15/00*** | (2006.01) |
| ***F02D 41/30*** | (2006.01) |
| ***F02D 41/00*** | (2006.01) |

(52) U.S. Cl.

CPC ....... *F02D 41/3094* (2013.01); *F02D 41/0025* (2013.01); *F02D 41/3082* (2013.01); *F02D 41/3845* (2013.01); *F02D 41/0027* (2013.01); *F02D 2041/389* (2013.01); *F02D 2200/021* (2013.01); *F02D 2200/0602* (2013.01); *F02D 2200/0606* (2013.01); *F02D 2250/02* (2013.01); *F02D 2250/31* (2013.01)

(58) Field of Classification Search

CPC ........... F02D 41/3094; F02D 41/0025; F02D 2250/31; F02D 41/3082; F02D 41/3836; F02D 41/2467; F02D 41/40; F02M 69/046

USPC .................. 123/464, 431, 446, 480; 701/104

See application file for complete search history.

(56) References Cited

U.S. PATENT DOCUMENTS

| | | | | |
|---|---|---|---|---|
| 7,467,615 | B2 | 12/2008 | Siewert | |
| 2006/0075992 | A1 * | 4/2006 | Akita et al. | F02D 41/3094 123/431 |
| 2006/0207562 | A1 * | 9/2006 | Miyazaki et al. | F02D 35/027 123/431 |
| 2009/0090332 | A1 * | 4/2009 | Brehob | F02D 35/025 123/464 |
| 2011/0097228 | A1 | 4/2011 | Tokuo et al. | |
| 2012/0167859 | A1 | 7/2012 | Basmaji et al. | |
| 2012/0174891 | A1 | 7/2012 | Marriott et al. | |
| 2012/0185152 | A1 | 7/2012 | Shibata et al. | |

FOREIGN PATENT DOCUMENTS

| | | | |
|---|---|---|---|
| EP | 1213457 | A2 | 6/2002 |

* cited by examiner

*Primary Examiner* — Lindsay Low
*Assistant Examiner* — Syed O Hasan
(74) *Attorney, Agent, or Firm* — Julia Voutyras; Alleman Hall McCoy Russell & Tuttle LLP

(57) ABSTRACT

A method, comprising: during engine cylinder operation with fuel from a first injector and not a second injector: increasing a rail pressure of a fuel rail coupled to the second injector in response to a temperature increase of a tip of the second injector. In this way, by raising the rail pressure of a fuel rail coupled to the second injector in response to a temperature increase of a tip of the second injector, the method may be utilized to prevent a vapor space from forming within the tip of the second injector which is exposed to the heat of combustion within the engine cylinder. By preventing a vapor space from forming, the method may be used to prevent fuel distillation in the tip of the second injector during periods where the engine cylinder is operating with fuel from a first injector and not the second injector.

19 Claims, 5 Drawing Sheets

METHOD FOR OPERATING A DIRECT FUEL INJECTION SYSTEM

BACKGROUND AND SUMMARY

Engines may be configured with various fuel systems used to deliver a desired amount of fuel to an engine for combustion. One type of fuel system includes a port fuel injector and a direct fuel injector for each engine cylinder. The port fuel injectors may be operated to improve fuel vaporization and reduce engine emissions, as well as to reduce pumping losses & fuel consumption at low loads. The direct fuel injectors may be operated during higher load conditions to improve engine performance and fuel consumption at higher loads. Additionally, both port fuel injectors and direct injectors may be operated together under some conditions to leverage advantages of both types of fuel delivery.

Engines operating with both port fuel injectors and direct injectors may operate for extended periods without using the direct injectors. During periods of non-use, the direct injector tips are exposed to high temperatures within the combustion cylinders resulting from the combustion of fuel injected from the port fuel injectors. Further, the increased temperature at the direct injector may lead to the vaporization of fuel within the direct injector. This may lead to fuel distillation within the injector tip, which may lead to deposits internal to the injector, and in turn affect the durability of the direct fuel injector.

The direct injectors may be cooled by periodically injecting fuel from the direct fuel injectors during operation of the vehicle. However, the inventors herein have recognized problems with this approach. As one example, it may be desirable to run maximum sustained PFI operation for improved fuel economy and reduced emissions. In another example, the direct fuel injectors may be coupled to a limited supply of fuel, which may thus be depleted and not be available when needed if fuel is constantly injected. Further, the periodic injection of fuel through the direct injectors may not be sufficient to prevent vapor space formation within the portions of the injector exposed to the heat of combustion within the engine cylinders.

In one example, some of the above described issues may be addressed with a method, comprising: during engine cylinder operation with fuel from a first injector and not a second injector: increasing a rail pressure of a fuel rail coupled to the second injector in response to a temperature increase of a tip of the second injector. In this way, an engine cylinder may be operated by combusting fuel from the first injector without affecting durability of the second injector. By raising the rail pressure of a fuel rail coupled to the second injector in response to a temperature increase of a tip of the second injector, the method may be utilized to prevent a vapor space from forming within the second injector, for example, within the tip of the second injector which is exposed to the heat of combustion within the engine cylinder. By preventing a vapor space from forming, the method may be used to prevent fuel distillation in the tip of the second injector during periods where the engine cylinder is operating with fuel from a first injector and not the second injector.

In another example, some of the above issues may be addressed by a fuel system for an internal combustion engine, comprising: a group of direct fuel injectors in communication with a group of cylinders, respectively; a first fuel rail in communication with the group of direct fuel injectors; a high-pressure fuel pump in communication with the first fuel rail; and a control system configured with instructions stored in memory for: during a first condition, increasing a rail pressure in the first fuel rail by operating the high-pressure fuel pump when a temperature of a tip of one or more of the group of direct injectors exceeds a first threshold. In this way, the fuel system may be utilized to regulate the pressure in the first fuel rail in response to an increased temperature by operating the high pressure fuel pump. The rail pressure of the first fuel rail may be regulated as a function of injector tip temperature. Thus, the high pressure fuel pump may be used to raise the fuel rail pressure to a pressure such that liquid fuel in the first fuel rail remains in liquid form.

In yet another example, some of the above issues may be addressed by a method, comprising: operating an engine cylinder with fuel from a first injector and not a second injector; during a first condition, increasing a rail pressure of a fuel rail coupled to the second injector in response to a temperature increase of a tip of the second injector; and during a second condition, injecting fuel from the second injector into the engine cylinder in response to the temperature increase. In this way, liquid fuel may be injected by the second injector, thus cooling the injector in response to the temperature increase. Further, liquid fuel injection may be limited to specific operating conditions, thus maintaining or improving engine emissions and fuel economy during operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
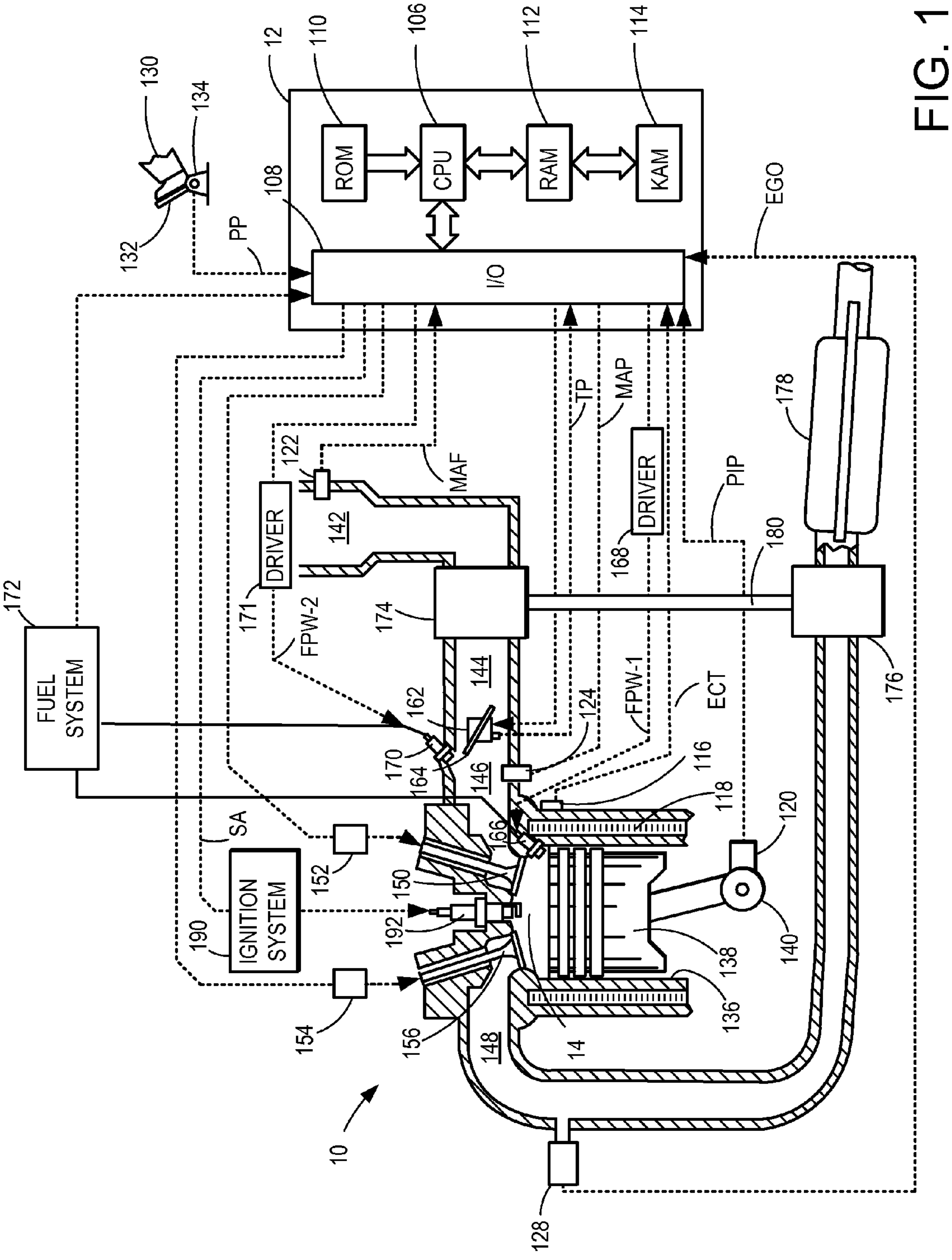
FIG. 1 schematically depicts an example embodiment of a cylinder of an internal combustion engine.
Figure 2:
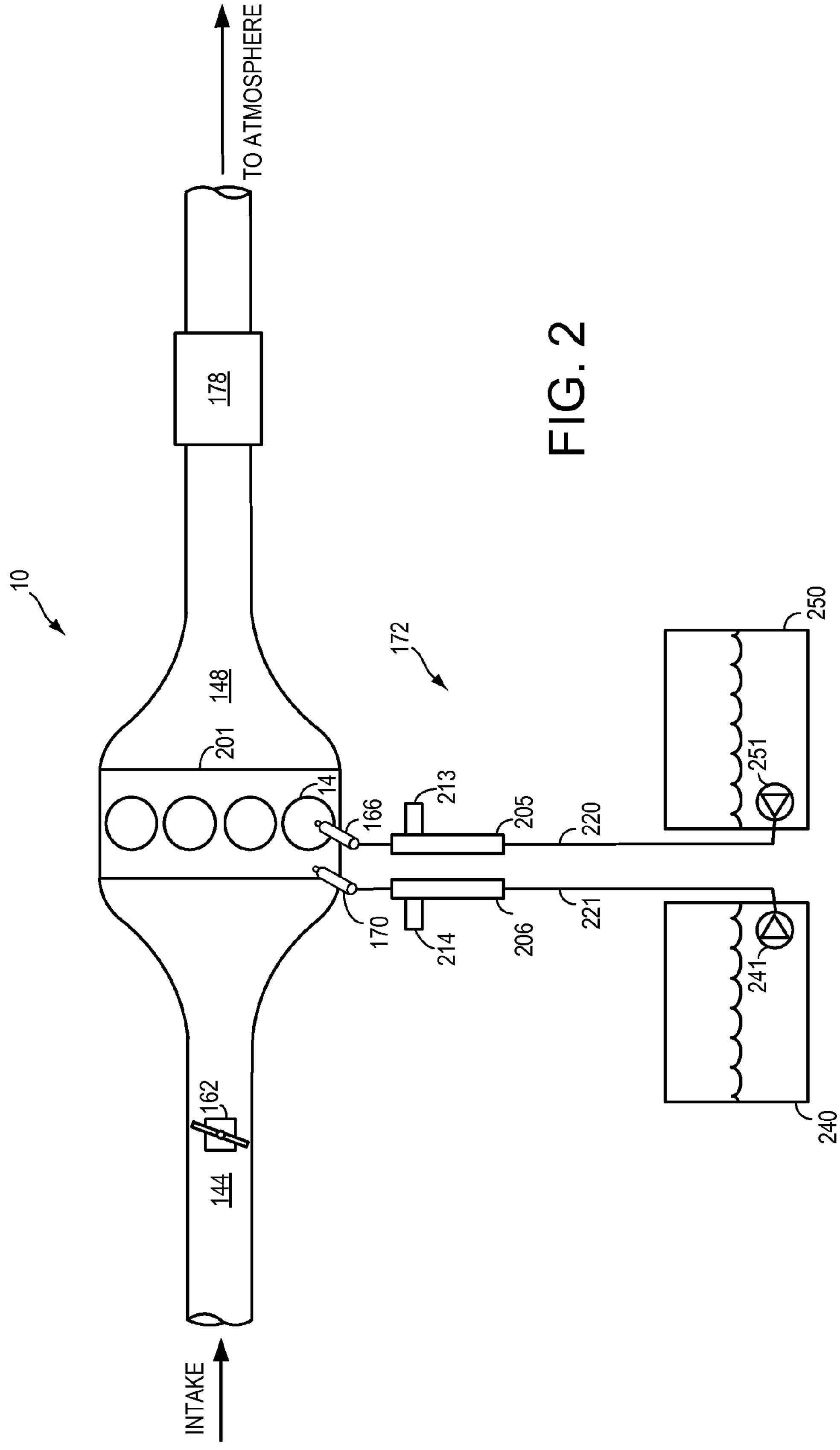
FIG. 2 schematically depicts an example embodiment of a multi-cylinder engine.
Figure 4:
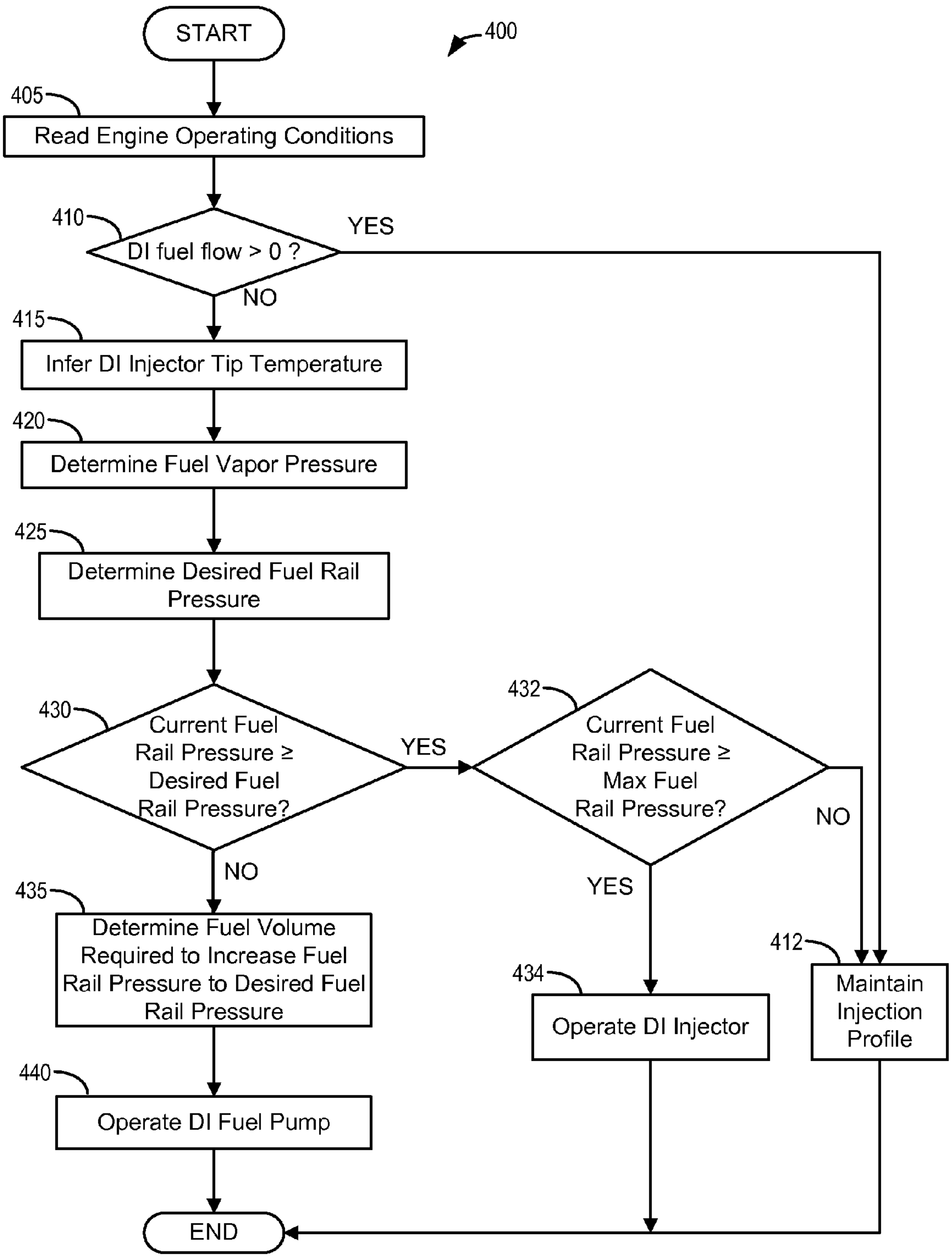
FIG. 4 depicts an example high level flow chart for operating an internal combustion engine including a port-fuel injection system and a direct-fuel injection system according to the present disclosure.
Figure 5:
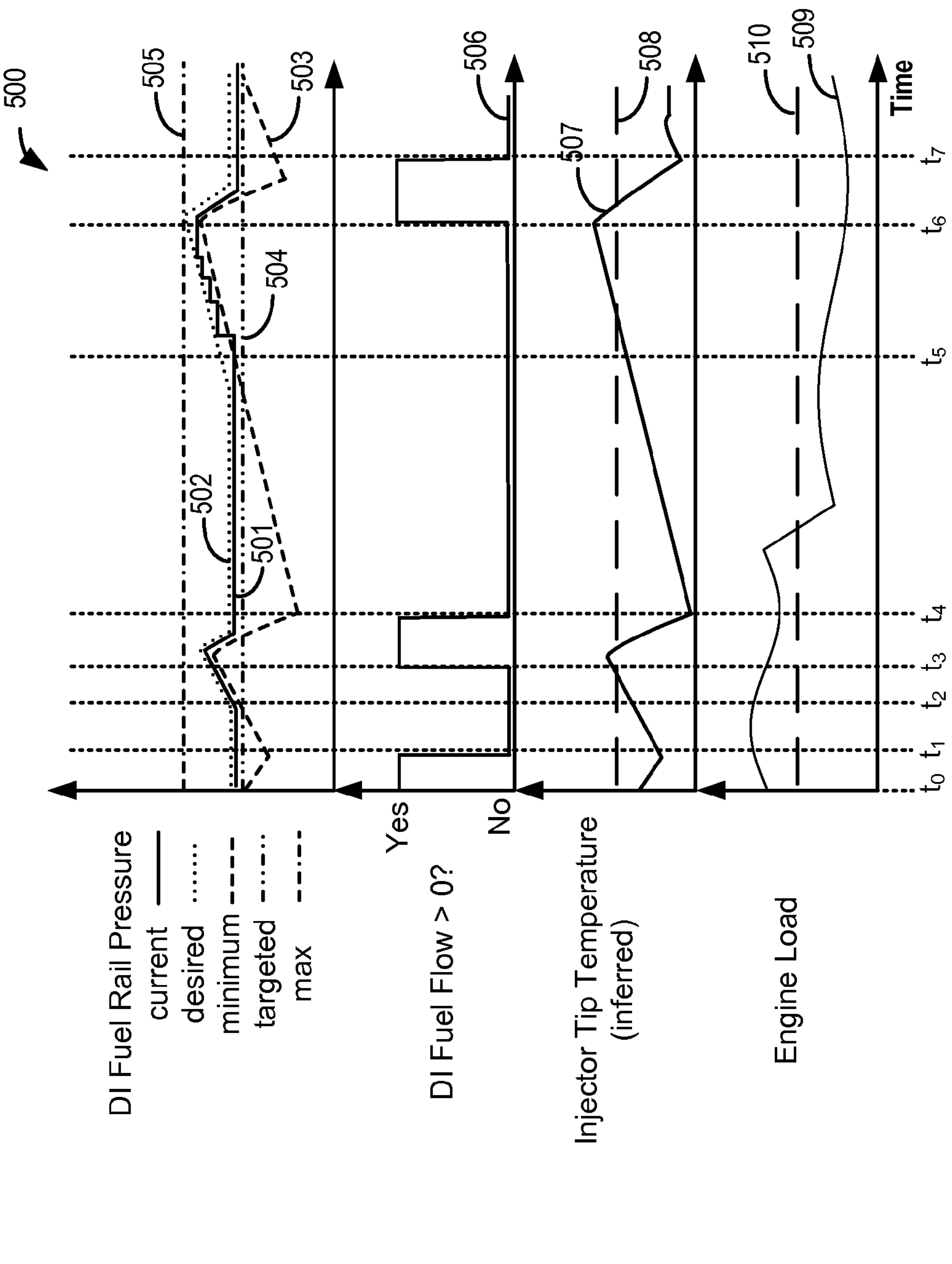
FIG. 5 is a graphical representation of an example timeline for vehicle operation and the operation of a direct-fuel injection system.

The present description relates to systems and methods for operating a direct fuel injection system within an engine system where more than one fuel injectors are coupled to an engine cylinder. In one non-limiting example, the engine may be configured as illustrated in FIG. 1. Further, additional components of a fuel injection system as depicted in FIG. 2 may be included in the engine depicted in FIG. 1. A method for operating a direct fuel injection may be provided by the systems illustrated in FIGS. 1 and 2 and the method illustrated in FIG. 3, which shows an example method for operating a direct fuel injector. An additional method for operating a direct fuel injection system is illustrated in FIG. 4. An example timeline for operating a direct fuel injection system in accordance with the above method and systems is depicted in FIG. 5.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank holding a liquid fuel, such as gasoline, and may also include another fuel tank holding a gaseous fuel, such as CNG, or LPG. Fuel injectors 166 and 170 may be configured to inject fuel from the same fuel tank, from different fuel tanks, from a plurality of the same fuel tanks, or from an overlapping set of fuel tanks. For example, an LPG tank may be coupled to the direct injector, and another fuel coupled to the port injector.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 3.

FIG. 2 shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166 and 170. Although only one cylinder is shown coupled to fuel injectors, it is to be understood that all cylinders 14 included in cylinder head 201 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions. Control of the timing and quantity of fuel injection will be discussed further below and with regards to FIGS. 3-5.

Fuel injector 170 is shown coupled to fuel rail 206. Fuel rail 206 may be coupled to fuel line 221. Fuel line 221 may be coupled to fuel tank 240. Fuel pump 241 may be coupled to fuel tank 240 and fuel line 221. Fuel rail 206 may include a plurality of sensors, including a temperature sensor and a pressure sensor, such as pressure sensor 214. Similarly, fuel line 221 and fuel tank 240 may include a plurality of sensors, including temperature and pressure sensors. Fuel tank 240 may also include a refueling port.

In some embodiments, fuel tank 240 may contain a gaseous fuel, such as CNG, methane, LPG, hydrogen gas, etc. In embodiments where fuel tank 240 contains a gaseous fuel, a tank valve may be coupled to fuel line 221 upstream of fuel pump 241. A line valve may be coupled to fuel line 221 upstream of the tank valve. A pressure regulator may be coupled to fuel line 221 upstream of the line valve. Fuel line 221 may also be coupled to a coalescing filter and may further include a pressure relief valve upstream of fuel rail 206.

Fuel injector 166 is shown coupled to fuel rail 205. Fuel rail 205 may be coupled to fuel line 220. Fuel line 220 may be coupled to fuel tank 250. Fuel pump 251 may be coupled to fuel tank 250 and fuel line 220. Fuel rail 205 may include a plurality of sensors, including a temperature sensor and a pressure sensor, such as pressure sensor 213. Similarly, fuel line 220 and fuel tank 250 may include a plurality of sensors, including temperature and pressure sensors. Fuel tank 250 may also include a refueling port. In some embodiments, fuel tank 250 may contain a liquid fuel, such as gasoline, diesel, ethanol, E85, etc. In embodiments where fuel tank 250 contains a liquid fuel and fuel tank 240 contains a gaseous fuel, fuel rail 205 may be configured as a higher-pressure fuel rail and fuel rail 206 may be configured as a lower pressure fuel rail.

The fuel system depicted in FIGS. 1 and 2 may enable a fuel system for an internal combustion engine, comprising: a group of direct fuel injectors in communication with a group of cylinders, respectively; a first fuel rail in communication with the group of direct fuel injectors; a high-pressure fuel pump in communication with the first fuel rail; and a control system configured with instructions stored in memory for: during a first condition, increasing a rail pressure in the first fuel rail by operating the high-pressure fuel pump when a temperature of a tip of one or more of the group of direct injectors exceeds a first threshold. In some examples, the first condition includes a bulk fuel flow through the direct fuel injector being substantially equal to zero. As used herein, the term "substantially equal to zero" includes bulk fuel flow as commanded by a controller, for example. There may be examples where some fuel leaks through the direct fuel injector, though the bulk fuel flow may be considered substantially equal to zero. For example, a leakage flow rate may be less than 1% of the total fuel entering an engine cylinder and still be considered substantially equal to zero. In some examples, the first condition may further include an engine load being lower than a second threshold.

The control system may be further configured with instructions stored in memory for: during a second condition, increasing a flow of fuel through the first fuel rail when a temperature of a tip of one or more of the group of direct injectors exceeds the first threshold. In some examples, the second condition may include a bulk fuel flow through the direct fuel injector being substantially equal to zero and further include an engine load being greater than the second threshold. In some examples, the control system may be further configured with instructions stored in memory for: inferring a temperature of a tip of one or more of the group of direct injectors based on engine operating conditions; determining a fuel vapor pressure of a fuel contained in the first fuel rail based on the inferred temperature; and commanding a desired fuel rail pressure, the desired fuel rail pressure based on the fuel vapor pressure. The desired fuel rail pressure may correspond to a pressure sufficient to prevent a vapor space from forming in the tip of one or more of the group of direct injectors. In some examples, the control system may be configured with instructions to infer a temperature of the hottest element of the DI fuel system in contact with the fuel. In a DI fuel system that is not in use, this is typically the injector tip, but may be another part of the DI fuel system.

In some examples, the system may further comprise a group of port fuel injectors in communication with the group of cylinders, respectively; a second fuel rail in communication with the group of port fuel injectors; and a low-pressure fuel pump in communication with the second fuel rail. The control system may be further configured with instructions stored in memory for: commanding an amount of fuel through the group of direct fuel injectors to be less than or equal to 10% of a total amount of fuel entering the group of cylinders.

In this way, an engine cylinder may be operated for prolonged periods of time with fuel from a port fuel injector and not from a direct fuel injector. In response to an increase in temperature seen by the tip of first fuel injector, the tip may be cooled by injecting fuel through the first fuel injector if one set of engine operating conditions are met, for example, if the engine is operating under high load conditions. If a different set of engine operating conditions are met, for example, the engine is operating under low or normal load conditions, the rail pressure of the high-pressure fuel rail may be raised to prevent the formation of a vapor space. The technical result of this system is that the fuel injector may be either cooled via fuel injection, (in particular, with a relatively small injection ratio through the DI fuel system) or placed under high fuel pressure to prevent fuel distillation during periods of non-use.

Figure 3:
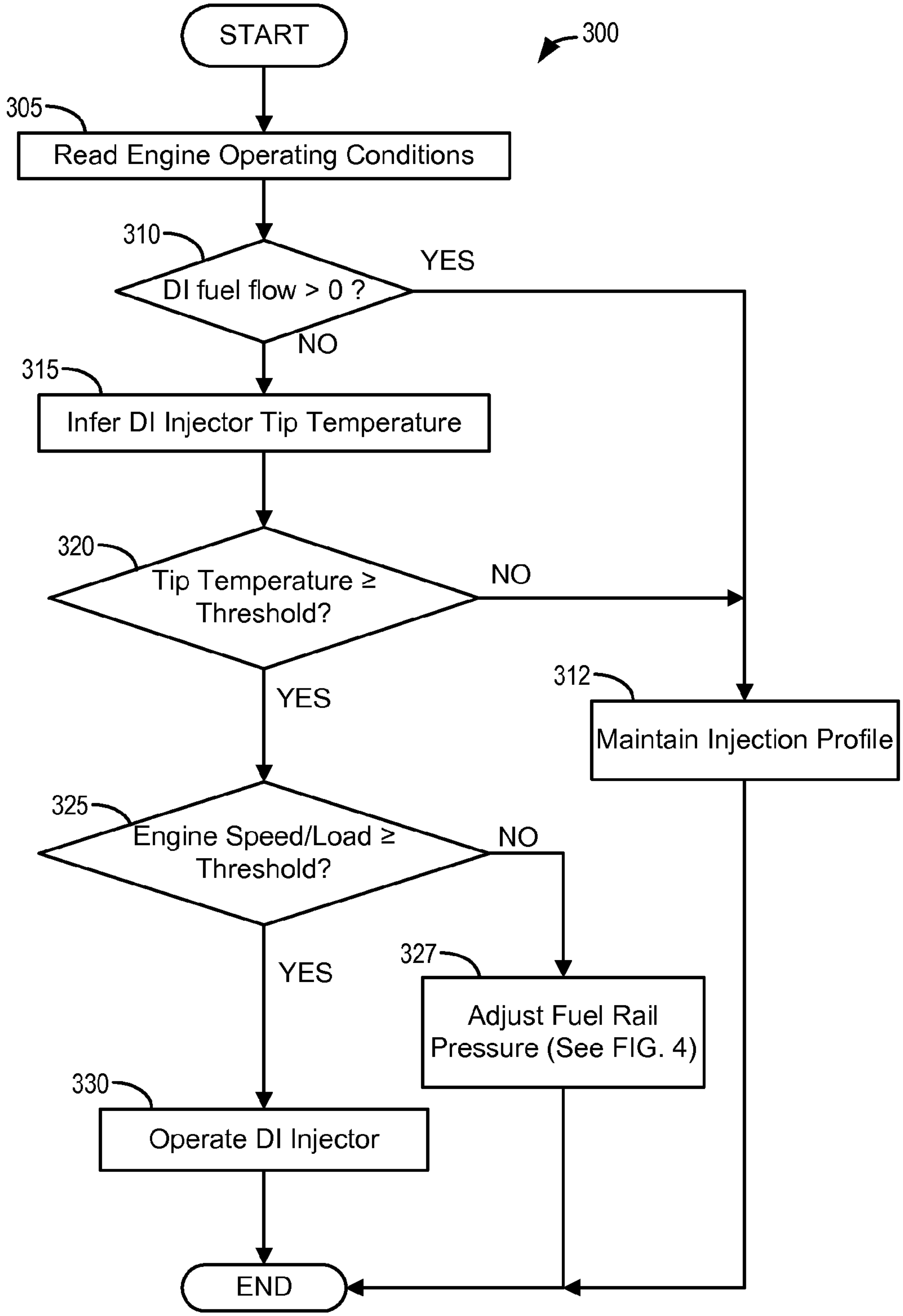
FIG. 3 depicts an example high level flow chart for operating an internal combustion engine including a port-fuel injection system and a direct-fuel injection system according to the present disclosure.

FIG. 3 shows an example method 300 for operating internal combustion engine 10 as depicted in FIGS. 1 and 2. Method 300 may be configured as computer instructions stored by a control system and implemented by a controller, for example controller 12 as shown in FIG. 1. At 305, method 300 may begin by reading engine operating conditions. Engine operating conditions may include engine speed, engine load, MAP pressure, MAF pressure, fuel levels, ambient pressure, on-board sensor readings (e.g. readings from pressure and temperature sensors), and the operating status of the fuel system.

At 310, method 300 may include determining if the current net fuel flow through a direct fuel injector is greater than 0. Determining the current net fuel flow may include evaluating the status of each direct fuel injector 166, and/or the status of fuel flow through first fuel rail 205 as shown in FIG. 2. If there is net fuel flow through one or more direct fuel injectors, method 300 may proceed to 312. At 312, method 300 may include maintaining the current injection profile, which may include maintaining the injection profile of one or more port fuel injectors and/or one or more direct fuel injectors.

If there is no net fuel flow through one or more direct fuel injectors 166, method 300 may proceed to 315. At 315, method 300 may include inferring the temperature of a direct fuel injector tip, for example the tip of direct fuel injector 166. The temperature of one or more direct fuel injector tips may be inferred. The inferring of the temperature of a direct fuel injector tip may include modeling the tip temperature as a function of measurable engine operating conditions. Measurable engine operating conditions may include engine coolant temperature, coolant pump speed, cylinder air charge, engine speed, charge cooling, liquid DI fuel injector flow, manifold charge temperature, or other such conditions. The direct fuel injector tip is heated by combustion events within cylinder 14. Increasing the air charge within cylinder 14 will result in a higher temperature at the injector tip. Similarly, increased engine speed will result in a higher temperature at the injector tip. An increase in cylinder air temperature prior to compression will result in an increased air temperature prior to ignition. The direct fuel injector is cooled through heat conduction through the cylinder head metal which may be in contact with the engine cooling jacket. Thus, the coolant temperature and coolant pump speed may impact heat removal capacity and further impact injector tip temperature.

At 320, method 300 may include determining if the inferred tip temperature is greater than a threshold temperature. The threshold temperature may be a predetermined temperature, or may be determined as a function of engine operating conditions. If the inferred tip temperature is not greater than the threshold temperature, method 300 may proceed to 312. At 312, method 300 may include maintaining the current injection profile, which may include maintaining the injection profile of one or more port fuel injectors and/or one or more direct fuel injectors.

If the inferred tip temperature is greater than the threshold temperature, method 300 may proceed to 325. At 325, method 300 may include determining whether the engine speed and/or engine load is greater than a threshold. The threshold may be predetermined or may be determined as a function of current engine operating conditions. If the engine speed and/or engine load is not greater than the threshold, method 300 may proceed to 327. At 327, method 300 may include adjusting the fuel rail pressure. An example subroutine for adjusting fuel rail pressure is discussed further below and with respect to FIG. 4.

If the engine speed and/or engine load is greater than the threshold, method 300 may proceed to 330. At 330, method 300 may include operating the DI fuel injector. In this way, liquid fuel passing through the injector tip will have a cooling effect on the tip. The amount of fuel injected may be predetermined or may be a function of engine operating conditions. For example, the total amount of liquid fuel injected through the direct injector may be controlled to be less than or equal to 10% of total fuel consumed by the engine. The amount of liquid fuel may be determined as a function of a desired injector tip temperature. In some cases, direct injection of liquid fuel may occur at regularly scheduled intervals to regulate injector tip temperature. Method 300 may then end.

Method 300 or other equivalent methods may be executed independently or as a subroutine for another engine operating method. Method 300 may be run repeatedly throughout the course of operating a vehicle, or may be run when specific operating conditions dictate.

The high level flowchart show in FIG. 3 (as well as the high level flowchart shown in FIG. 4) may enable one or more methods. In one example, a method, comprising: operating an engine cylinder with fuel from a first injector and not a second injector; during a first condition, increasing a rail pressure of a fuel rail coupled to the second injector in response to a temperature increase of a tip of the second injector; and during a second condition, discontinuing the operation with no fuel injected from the second injector and commencing injecting fuel from the second injector into the engine cylinder in response to the temperature increase. In some examples, the first condition may include an engine load lower than a load threshold, and the second condition may include an engine load greater than the load threshold. In some examples, the first condition may include an engine speed lower than a speed threshold, and the second condition may include an engine speed greater than the speed threshold.

In this way, the injector tip may be cooled through the injection of liquid fuel during engine operating conditions including a high engine speed or load. During engine operating conditions including a low or normal engine speed or load, the fuel rail pressure may be raised to prevent a vapor space from forming in the injector tip, thus preventing fuel distillation from occurring in the injector tip. The technical result of this method is that injector durability may be increased without injecting liquid fuel except during high engine load or high engine speed conditions.

FIG. 4 shows an example method 400 for operating internal combustion engine 10 as depicted in FIGS. 1 and 2. Method 400 may be configured as computer instructions stored by a control system and implemented by a controller, for example controller 12 as shown in FIG. 1. Method 400 may be executed independently or as a sub-routine for another engine operating method, for example method 300. Method 400 may be run repeatedly throughout the course of operating a vehicle, or may be run when specific operating conditions dictate.

Method 400 may begin at 405 by reading engine operating conditions. Engine operating conditions may include engine speed, engine load, MAP pressure, MAF pressure, fuel levels, ambient pressure, on-board sensor readings (e.g. readings from pressure and temperature sensors), and the operating status of the fuel system.

At 410, method 400 may include determining if the current net fuel flow through a direct fuel injector is greater than 0. Determining the current net fuel flow may include evaluating the status of each direct fuel injector 166, and/or the status of fuel flow through first fuel rail 205 as shown in FIG. 2. If there is net fuel flow through one or more direct fuel injectors, method 400 may proceed to 412. At 412, method 400 may include maintaining the current injection profile, which may include maintaining the injection profile of one or more port fuel injectors and/or one or more direct fuel injectors.

If there is no net fuel flow through one or more direct fuel injectors 166, method 400 may proceed to 415. At 415, method 400 may include inferring the temperature of a direct fuel injector tip, for example the tip of direct fuel injector 166. The temperature of one or more direct fuel injector tips may be inferred. The inferring of the temperature of a direct fuel injector tip may include modeling the tip temperature as a function of measurable engine operating conditions. Measurable engine operating conditions may include engine coolant temperature, coolant pump speed, cylinder air charge, engine speed, charge cooling, liquid DI fuel injector flow, manifold charge temperature, or other such conditions.

At 420, method 400 may include determining a fuel vapor pressure. The fuel vapor pressure may be representative of the fuel currently in fuel tank 250 (and thus the fuel currently in fuel rail 205) or may be representative of the most volatile fuel that may be seen by the liquid fuel direct injection system. The fuel vapor pressure value may be determined through a look-up table or similar data accessible to controller 12.

At 425, method 400 may include determining a desired fuel rail pressure. The desired fuel rail pressure may be a function of the determined fuel vapor pressure. For example, the desired fuel rail pressure may equal to the determined fuel vapor pressure plus an additional pressure equal to a predetermined safety margin. The desired fuel rail pressure may be a pressure that is great enough to prevent the formation of a vapor space within the direct injector. In this way, the distillation of fuel at the injector tip may be prevented. The hottest part of the injector tip (just upstream of the injector valve or pintle) is most prone to distillation. The desired fuel rail pressure needed to prevent the formation of a vapor space may be significantly higher than for industry standard high pressure fuel rails, which typically raise the fuel rail pressure high enough to prevent vaporization in the majority section of the fuel rail, but may not regulate fuel rail pressure to prevent fuel vaporization where temperature is highest. In some example, the desired fuel rail pressure may be determined as the greater of a minimum fuel rail pressure necessary to prevent a vapor space from forming in the injector tip and a minimum target fuel rail pressure. In the scenario where the DI fuel injector is in use or has recently been in use, the injector tip may be cool, and thus the minimum fuel rail pressure necessary to prevent a vapor space from forming in the injector tip may be relatively low. Rather than commanding the desired fuel rail pressure to this relatively low pressure, a minimum target fuel rail pressure may be selected as the desired fuel rail pressure. The minimum target fuel rail pressure may be predetermined or may be a function of engine operating conditions. An example scenario for calculating a desired fuel rail pressure is discussed further below and with regards to FIG. 5.

At 430, method 400 may include determining whether the current fuel rail pressure is greater than or equal to the desired fuel rail pressure. The current fuel rail pressure may be determined by taking a reading from a fuel rail pressure sensor, such as pressure sensor 213 as shown in FIG. 2. If the current fuel rail pressure is greater than or equal to the desired fuel rail pressure, method 400 may proceed to 432. At 432, method 400 may include determining whether the current fuel rail pressure is greater than or equal to a maximum allowable fuel rail pressure. The maximum allowable fuel rail pressure may be a predetermined pressure or may be determined as a function of current engine operating conditions. If the current fuel rail pressure is less than the maximum allowable fuel rail pressure, method 400 may proceed to 412. At 412, method 400 may include maintaining the current injection profile, which may include maintaining the injection profile of one or more port fuel injectors and/or one or more direct fuel injectors. Method 400 may then end. If the current fuel rail pressure is greater than or equal to the maximum allowable fuel rail pressure, method 400 may proceed to 434. At 434, method 400 may include operating the DI fuel injector. In this way, the injector tip will be cooled by liquid fuel, and the desired fuel rail pressure will be decreased. Method 400 may then end.

If the current fuel rail pressure is less than the desired fuel rail pressure as determined at 430, method 400 may proceed to 435. At 435, method 400 may include determining a fuel volume required to increase the fuel rail pressure to the desired fuel rail pressure. At 440, method 400 may include operating the DI fuel pump to supply the determined fuel volume to the DI fuel rail. Method 400 may then end.

The high level flowchart show in FIG. 4 (as well as the high level flowchart shown in FIG. 3) may enable one or more methods. In one example, a method, comprising: during engine cylinder operation with fuel from a first injector and not a second injector: increasing a rail pressure of a fuel rail coupled to the second injector in response to a temperature increase of a tip of the second injector. In engine cylinder operation with fuel from a first injector and not a second injector, during a combustion cycle, the only fuel combusted in the cylinder is fuel from the first injector, and no fuel is injected from the second injector during that combustion cycle, including during the intake, compression, power and exhaust strokes. In some examples, the second injector may be configured as a direct fuel injector, and in some examples, the first injector may be configured as a port fuel injector. The rail pressure may be increased in response to an increase in fuel vapor pressure, the fuel vapor pressure increase corresponding to the temperature increase of the tip of the second injector. The fuel rail may be configured to hold a liquid fuel at high pressure. In some examples, the rail pressure may be increased in response to an increase in desired fuel rail pressure, the desired fuel rail pressure corresponding to a pressure sufficient to prevent a vapor space from forming in the tip of the second injector. Increasing the rail pressure of the fuel rail may further comprise operating a fuel pump coupled to the fuel rail. In some examples, the method may further comprise determining a fuel volume sufficient to increase the rail pressure to the desired fuel rail pressure; and commanding the fuel pump to add the fuel volume to the fuel rail.

In this way, an engine cylinder may be operated for extended periods of time by combusting fuel injected by the first injector without affecting durability of the second injector. By raising the rail pressure of a fuel rail coupled to the second injector in response to a temperature increase of a tip of the second injector, the method may be utilized to prevent a vapor space from forming within the second injector, for example, within the tip of the second injector which is exposed to the heat of combustion within the engine cylinder. By preventing a vapor space from forming, the method has the technical result of preventing fuel distillation in the tip of the second injector during periods where the engine cylinder is operating with fuel from a first injector and not the second injector.

FIG. 5 depicts a graphical representation of timeline 500 for engine operation and for the operation of a direct fuel injector. Timeline 500 includes graphical representation of current fuel rail pressure, shown by line 501. Timeline 500 further includes graphical representation of desired fuel rail pressure, shown by line 502, minimum fuel rail pressure needed to prevent a vapor space from forming in the fuel injector tip, shown by line 503, minimum targeted fuel rail pressure, shown by line 504, and maximum allowable fuel rail pressure, shown by line 505. Timeline 500 further includes graphical representation of the direct injection fuel flow, shown by line 506. Line 506 is depicted as representing two operating conditions, fuel flow greater than 0 and fuel flow equal to 0. Timeline 500 further includes graphical representation of injector tip temperature, shown by line 507. For example, line 507 may represent inferred injector tip temperature as described above with regards to FIGS. 3 and 4. Timeline 500 further depicts an injector tip temperature threshold 508. For example, threshold 508 may be the threshold discussed above with regards to 315 depicted in FIG. 3. Timeline 500 further includes graphical representation of engine load, as shown by line 509, and further depicts an engine load threshold 510. For example, threshold 510 may be the threshold discussed above with regards to 325 depicted in FIG. 3.

At time $t_0$, the DI fuel flow rate is greater than 0, and the injector tip temperature is below temperature threshold 508. Thus, no further action is needed to decrease injector tip temperature. At time $t_1$, direct injection of fuel ceases, and the DI fuel flow rate is equal to 0. From time $t_1$ to time $t_2$, the injector tip temperature is below temperature threshold 508 and the current fuel rail pressure is equal to the desired fuel rail pressure Thus, no further action is needed to decrease injector tip temperature.

At time $t_2$, the DI fuel rate is equal to 0. The engine may be operating solely from fuel injected through the port fuel injection system. As such, the inferred injector tip temperature increases, as shown by line 507. As injector tip temperature increases, the minimum fuel rail pressure needed to prevent a vapor space from forming in the fuel injector tip increases, as shown by line 503. At time $t_2$, the minimum fuel rail pressure needed to prevent a vapor space from forming in the fuel injector tip becomes greater than the minimum targeted fuel rail pressure, as shown by line 504. As described above with regards to FIG. 4, the desired fuel rail pressure may be set equal to the greater of the minimum fuel rail pressure needed to prevent a vapor space from forming in the fuel injector tip and the minimum targeted fuel rail pressure. From $t_2$ to $t_3$, the DI fuel rate is equal to 0 and the desired fuel rail pressure (502) increases with the increase in inferred fuel injector tip temperature (507). As discussed above with regard to FIG. 4, these conditions indicate that fuel rail pressure may need to be increased by adding fuel to the fuel rail via the DI fuel pump. Accordingly, controller 12 may calculate a fuel volume required to increase the current fuel rail pressure to the desired fuel rail pressure. The calculated fuel volume is then pumped into the DI fuel rail by the DI fuel pump and the current DI fuel rail pressure reaches a value greater than or equal to the desired fuel rail pressure. In this way, vapor spaces in the fuel injected may be mitigated, and fuel vapor distillation may be prevented.

At time $t_3$, the DI fuel flow rate is equal to 0, and injector tip temperature becomes greater than temperature threshold 508. The engine load is greater than engine load threshold 510. As described above with regards to FIG. 3, these conditions indicate that injector tip temperature needs to be decreased by passing liquid fuel through the DI fuel injector. In response, DI fuel flow is increased above 0 from $t_3$ to $t_4$. As a result, injector tip temperature decreases below temperature threshold 508. Accordingly, the minimum fuel rail pressure needed to prevent a vapor space from forming in the fuel injector tip decreases below the minimum targeted fuel rail pressure, and thus the desired fuel rail pressure is set equal to the minimum targeted fuel rail pressure.

At time $t_3$, direct injection of fuel ceases, and the DI fuel flow rate is equal to 0. From time $t_4$ to time $t_5$, the injector tip temperature is below temperature threshold 508, and the current fuel rail pressure is maintained at the desired fuel rail pressure, which is set equal to the minimum targeted fuel rail pressure. Thus no further action is needed to decrease injector tip temperature.

At time $t_5$, the DI fuel flow rate is equal to 0, and minimum fuel rail pressure needed to prevent a vapor space from forming in the fuel injector tip increases above the minimum targeted fuel rail pressure. The engine load is less than engine load threshold 509. As discussed above with regard to FIG. 4, these conditions indicate that fuel rail pressure may need to be increased by adding fuel to the fuel rail via the DI fuel pump. Accordingly, controller 12 may calculate a fuel volume required to increase the current fuel rail pressure to the desired fuel rail pressure. The calculated fuel volume is then pumped into the DI fuel rail by the DI fuel pump. This operation is repeated at three additional times between $t_5$ and $t_6$ as the injector tip temperature continues to increase during this period when the engine is operating exclusively from fuel injected from the PFI system.

At time $t_6$, the desired fuel rail pressure increases to a value greater than or equal to the maximum allowable fuel rail pressure, shown by line 505. As discussed above with regard to FIG. 4 these conditions indicate that injector tip temperature needs to be decreased by passing liquid fuel through the DI fuel injector. In response, DI fuel flow is increased above 0 from $t_6$ to $t_7$. As a result, injector tip temperature decreases below temperature threshold 508. Accordingly, the minimum fuel rail pressure needed to prevent a vapor space from forming in the fuel injector tip decreases below the minimum targeted fuel rail pressure, and thus the desired fuel rail pressure is set equal to the minimum targeted fuel rail pressure.

In some embodiments, the fuel rail pressure may be maintained at the desired fuel rail pressure regardless of the inferred injector tip temperature. The current fuel rail pressure may drop below the desired fuel rail pressure during periods of time when the DI fuel injector is actively injecting fuel into a combustion cylinder, and then be commanded to return to the desired fuel rail pressure during periods of time when the DI fuel injector is inactive.

In some embodiments, the DI fuel pump piston pressure may be regulated in concert with the regulation of the fuel rail pressure. The maintaining of a high pump chamber pressure results in effective lubrication of the DI fuel pump.

In some examples, the DI pump may be maintained at a small duty cycle. In this way, DI fuel pump piston pressure may be increased without building excessive fuel rail pressure while the DI fuel injector is not in use.

In some examples, the fuel rail pressure may be raised to the desired fuel rail pressure using a first DI fuel pump duty cycle, and then maintained at the desired fuel rail pressure using a second DI fuel pump duty cycle that is smaller than the first DI pump duty cycle. This configuration may have the benefit of reducing fuel pump noise.

In some embodiments, a check valve and pressure relief valve may be coupled between the fuel pump and fuel rail. In this way, a default fuel rail pressure may be commanded while simultaneously maintaining a constant DI fuel pump piston pressure.

In some embodiments, the fuel system may be pressurized to a pressure above the vapor pressure of the fuel at all times. In systems where DI fuel flow is shut off at times when the engine is operating exclusively from fuel injected through the PFI system, the required pressure may be significantly higher than for a traditional DI fuel system. The desired fuel rail pressure may be a function of the fuel's bulk modulus effect, and/or the fuel's vapor pressure effect. For example, given an engine with side DI injectors at a medium to high load, the desired fuel rail pressure may range from 150 to 200 bar in the fuel rail (e.g. injector pressure).

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

during engine cylinder operation with fuel from a first injector and not a second injector:

increasing a rail pressure of a fuel rail coupled to the second injector in response to a temperature increase of a tip of the second injector greater than a threshold temperature, rail pressure repeatedly increased by repeatedly pumping fuel into the fuel rail via a high pressure fuel pump while maintaining no net flow through the second injector.

2. The method of claim 1, wherein the second injector is configured as a direct fuel injector, there being a plurality of direct injectors, and the rail pressure is increased while no net flow through the direct injectors is maintained.

3. The method of claim 1, wherein the rail pressure is increased in response to an increase in fuel vapor pressure, the fuel vapor pressure increase corresponding to the temperature increase of the tip of the second injector.

4. The method of claim 1, wherein the fuel rail is configured to hold a liquid fuel at a high pressure, and wherein the fuel rail pressure is repeatedly increased until there is flow through the second injector.

5. The method of claim 4, wherein the rail pressure is increased in response to an increase in desired fuel rail pressure, the desired fuel rail pressure corresponding to a pressure sufficient to prevent a vapor space from forming in the tip of the second injector.

6. The method of claim 4, where increasing the rail pressure of the fuel rail further comprises repeatedly operating the high pressure fuel pump coupled to the fuel rail, the high pressure fuel pump pumping fuel with a fuel pump piston.

7. The method of claim 6, further comprising:

determining a fuel volume sufficient to increase the rail pressure to the desired fuel rail pressure; and commanding the fuel pump to add the fuel volume to the fuel rail.

8. The method of claim 1, wherein the first injector is configured as a port fuel injector.

9. A fuel system for an internal combustion engine, comprising:

a group of direct fuel injectors in communication with a group of cylinders, respectively;

a first fuel rail in communication with the group of direct fuel injectors;

a high-pressure fuel pump in communication with the first fuel rail; and a control system configured with instructions stored in memory for: during a first condition including a bulk fuel flow through the direct fuel injector being substantially equal to zero, increasing a rail pressure in the first fuel rail by operating the high-pressure fuel pump when a temperature of a tip of one or more of the group of direct injectors exceeds a first threshold, and repeatedly increasing rail pressure of the first fuel rail by repeatedly pumping fuel into the first fuel rail via the high-pressure fuel pump while maintaining the zero flow through the direct injectors.

10. The system of claim 9, wherein the first condition further includes an engine load being lower than a load threshold.

11. The system of claim 10, wherein the control system is further configured with instructions stored in memory for: during a second condition, increasing a flow of fuel through the first fuel rail when the temperature of the tip of one or more of the group of direct injectors exceeds the first threshold.

12. The system of claim 11, where the second condition includes an engine load being greater than the load threshold, and increasing a flow of fuel through the first fuel rail includes discontinuing the operation with no fuel injected from the direct injectors and commencing injecting fuel from the direct injectors into the engine cylinder in response to the temperature increase.

13. The system of claim 9, wherein the control system is further configured with instructions stored in memory for:

inferring the temperature of the tip of one or more of the group of direct injectors based on engine operating conditions;

determining a fuel vapor pressure of a fuel contained in the first fuel rail based on the inferred temperature; and commanding a desired fuel rail pressure, the desired fuel rail pressure based on the fuel vapor pressure.

14. The system of claim 13, where the desired fuel rail pressure corresponds to a pressure sufficient to prevent a vapor space from forming in the tip of one or more of the group of direct injectors.

15. The system of claim 12, further comprising:

a group of port fuel injectors in communication with the group of cylinders, respectively;

a second fuel rail in communication with the group of port fuel injectors; and a low-pressure fuel pump in communication with the second fuel rail.

16. The system of claim 15, where the control system is further configured with instructions stored in memory for: commanding an amount of fuel through the group of direct fuel injectors to be less than or equal to 10% of a total amount of fuel entering the group of cylinders.

17. A method, comprising:

operating an engine cylinder with fuel from a first injector and not a second injector;

during a first condition, increasing a rail pressure of a fuel rail coupled to the second injector in response to a temperature increase of a tip of the second injector beyond a threshold, the pressure repeatedly increased multiple times in response to the temperature continuing to increase above the threshold while maintaining no injection from the second injector during the repeated increase; and during a second condition, injecting fuel from the second injector into the engine cylinder in response to the temperature increase and the repeatedly increased fuel rail pressure reaching a maximum pressure threshold.

18. The method of claim 17, wherein the first condition includes an engine load lower than a load threshold, and wherein the second condition includes an engine load greater than the load threshold.

19. The method of claim 17, wherein the first condition includes an engine speed lower than a speed threshold, and wherein the second condition includes an engine speed greater than the speed threshold.

* * * * *